(No Model.)

A. J. MARTIN & E. J. CORSER.
CHANGEABLE SPEED GEARING.

No. 443,370. Patented Dec. 23, 1890.

Witnesses:
Edw. A. Simpson Jr.
Arthur C. Clarke

Inventors
A. J. Martin
E. J. Corser
By their Attorney

UNITED STATES PATENT OFFICE.

ANDREW J. MARTIN AND EDSON J. CORSER, OF MACEDON, NEW YORK.

CHANGEABLE-SPEED GEARING.

SPECIFICATION forming part of Letters Patent No. 443,370, dated December 23, 1890.

Application filed September 15, 1890. Serial No. 364,997. (No model.)

*To all whom it may concern:*

Be it known that we, ANDREW J. MARTIN and EDSON J. CORSER, both of Macedon, in the county of Wayne and State of New York, have invented certain new and useful Improvements in Changeable-Speed Gearing, of which the following is a specification.

Our invention relates to certain improvements, as hereinafter claimed, in that class of gearing by which different speeds may be transmitted to driven pinions from driving-pinions by way of intermediate gearing without varying the speed at which such driving-pinions are rotated.

Our objects mainly are to provide strong, durable, and readily-adjustable changeable-speed gearing for actuating the distributing devices of seed and fertilizer distributers, whereby either a slow and strong movement may be imparted, such as best adapted for spreading fertilizers, or a quick movement be imparted suitable for operating distributers of wheat, &c.

Figure 1:
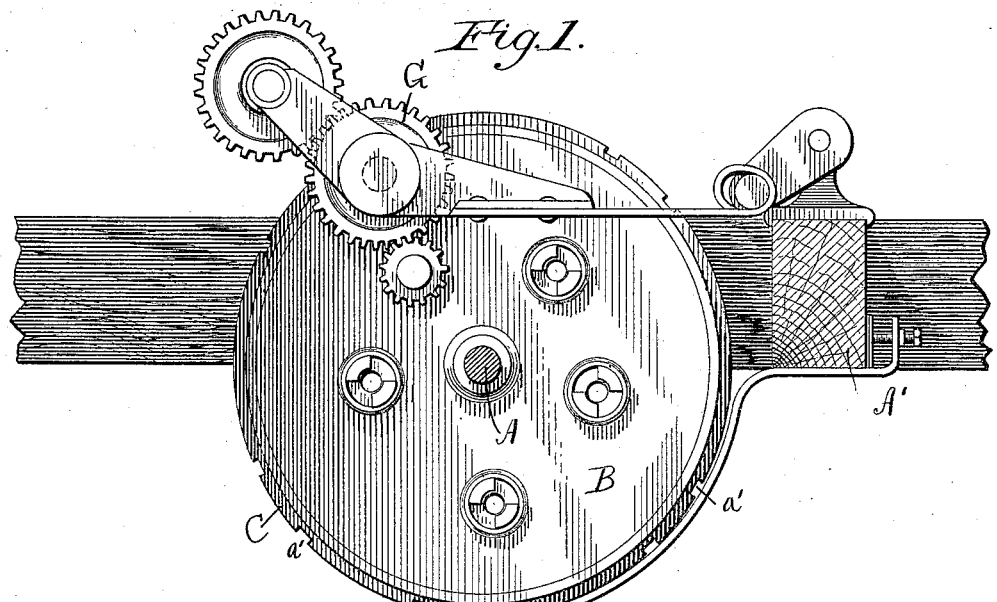
Figure 2:
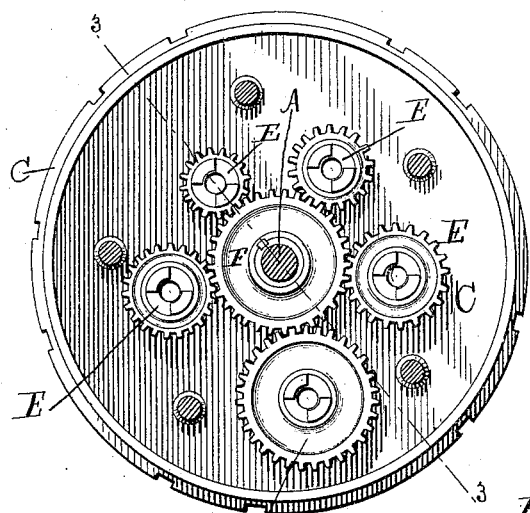
Figure 3:
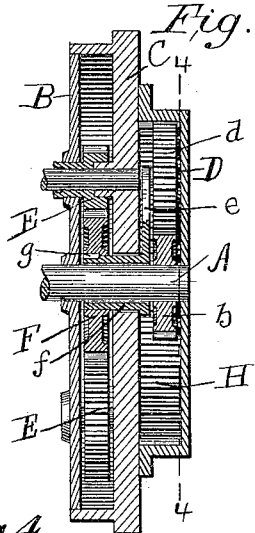
Figure 4:
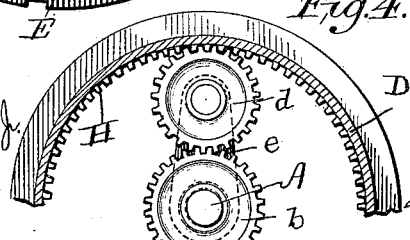

In the accompanying drawings, which show our improvements as embodied in connection with gearing involving features set forth in United States Letters Patent, No. 432,418, dated July 15, 1890, Figure 1 is a side elevation showing the gearing as applied to the frame of a machine for distributing seed or fertilizer. Fig. 2 is a side view with parts in section and a portion of the gear-casing removed. Fig. 3 is a section on the line 3 of Fig. 2; and Fig. 4 is a detail view, partly in elevation and partly in section, on the line 4 of Fig. 3.

The driving shaft or axle A, suitably mounted, is rotated in proper way, as with the supporting-wheels of a machine for distributing seed and fertilizers. A sectional gear-casing (shown as consisting of three circular or disk-like parts B C D, detachably connected with each other, as by screws or bolts in obvious way) serves to mount and protect the gearing. This gear-casing is adapted to turn about the axle A, and a spring-latch $a$, secured to the main frame A' of the machine and engaging with notches $a'$ in the periphery of the gear-casing, serves to hold this casing in the required position when adjusted as in the aforesaid Patent No. 432,418.

A series of transmitting-gears E, adjustable with the casing, each engages with a central pinion F, and any one of these different-sized gears E may be adjusted by turning the gear-casing so as to engage with the driven pinion G to actuate the distributing mechanism, as will be understood by reference to the above-recited patent.

In accordance with our improvements, instead of imparting motion from the driving shaft or axle to the series of different-sized transmitting-gears E, by means such as set forth in Patent No. 432,418, we employ mechanism differing therefrom in essential respects, and as next to be described.

Motion is communicated from the driving-pinion $b$, fast on the axle, to a loose pinion $d$, mounted by a stud-shaft at the outer end of a rotating arm or carrier $e$. This arm turns about the axle on which it is loosely mounted by the hub $f$. The central pinion F turns with the rotating carrier $e$, being fixed, as by key $g$, to the carrier-hub. Rotation of the carrier about the axle as the carrier-pinion $d$ is actuated by the driving-pinion is caused by the engagement of the carrier-pinion with a non-rotating internal gear or gearing H of the casing-section D.

In operation it will be seen that the movement imparted from the axle to the rotating carrier is, by way of the carrier-attached central gear F and transmitting-gears E, imparted to the distributing devices of the machine to actuate such devices with desired speed, and that by the employment, in connection with the series of transmitting-gears, of the rotating carrier and the central gear attached to the hub thereof a very strong arrangement of gearing is secured, admitting of a wide range of adjustment as to speed and power, and adapting the one set of gearing for all the uses to which combined seed-distributing and fertilizer-spreading machines may be put.

We claim as our invention—

1. The combination of the driving-shaft, the adjustable gear-casing, the driving-pinion, the rotating carrier, the pinion mounted thereon and gearing with the driving-pinion, the internal gear engaged by the carrier-pinion, the central gear actuated by the rotating carrier, and the series of adjustable transmitting-gears engaging with the central gear, substantially as and for the purpose set forth.

2. The combination of the three-part sectional casing, one of which parts is provided with the internal gear, the driving-shaft, the driving-pinion, the rotating carrier, the pinion carried by the rotating carrier, engaging said internal gear and actuated by the driving-pinion, and the central gear carried by the hub of the carrier, substantially as and for the purpose set forth.

In testimony whereof we have hereunto subscribed our names.

ANDREW J. MARTIN.
EDSON J. CORSER.

Witnesses:
JOE L. THISTLETHWAITE,
PATRICK QUINN.